Oct. 7, 1947.    G. L. GODWIN    2,428,564
CONTROL SYSTEM FOR SYNCHRONOUS DYNAMO-ELECTRIC MACHINES
Filed Jan. 19, 1945
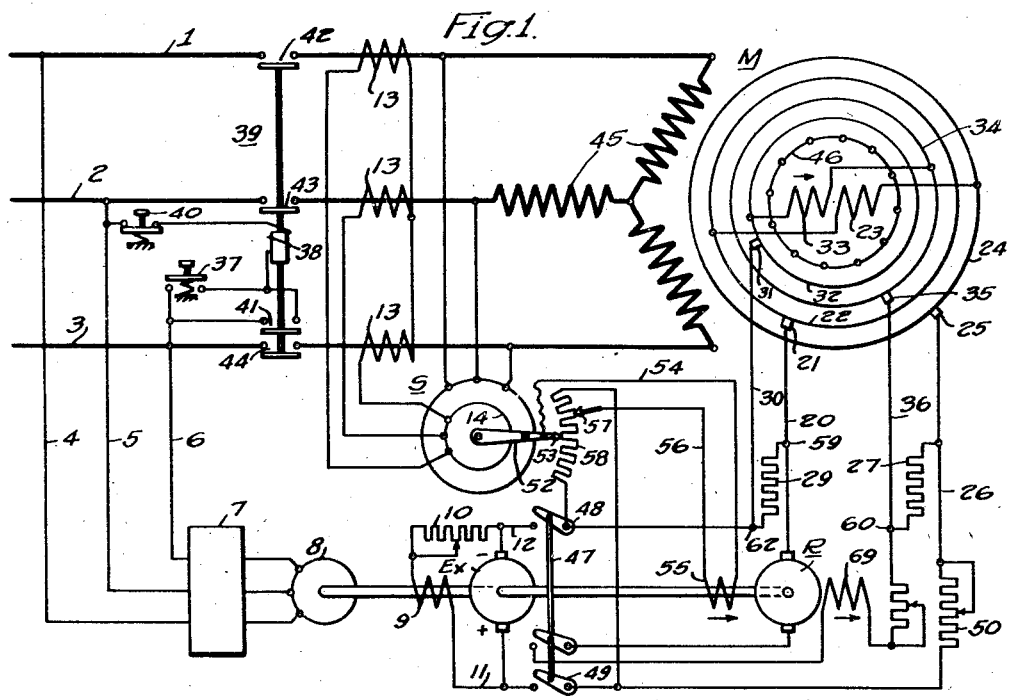
WITNESSES:
INVENTOR
Gurney L. Godwin.
BY
Paul E. Friedmann
ATTORNEY Patented Oct. 7, 1947

2,428,564

UNITED STATES PATENT OFFICE 2,428,564

CONTROL SYSTEM FOR SYNCHRONOUS DYNAMOELECTRIC MACHINES

Gurney L. Godwin, Wilkinsburg, Pa., assignor to Westinghouse Electric Corporation. East Pittsburgh, Pa., a corporation of Pennsylvania Application January 19, 1945, Serial No. 573,555

9 Claims. (Cl. 172—274)

My invention relates to electric systems of control and more particularly to systems of control for controlling the excitation of synchronous dynamoelectric machines.

Various methods and apparatus have heretofore been proposed to control the excitation of synchronous dynamoelectric machines but the apparatus heretofore in use is complicated, expensive and often unreliable.

It is an object of my invention to provide simple and efficient means for exciting a synchronous dynamoelectric machine as a function of a fixed voltage and the voltage and load current of the machine.

Another specific object of my invention is the provision of a regulating generator, connected to the galvanometer terminals of a balanced Wheatstone bridge, for varying the excitation of a synchronous dynamoelectric machine by alterations of the voltage of the regulating generator as a function of changes in power factor of the synchronous dynamoelectric machine.

A still further object of my invention is the provision of regulating the output voltage of a regulating generator from zero voltage either in a positive sense or in a negative sense as a function of the variations of the power factor of a synchronous dynamoelectric machine from a selected power factor to a power factor more lagging or to a power factor more leading with respect to the selected power factor.

Another object of my invention is to maintain constant power factor of a synchronous machine.

A more specific object of my invention is the provision of simple rotating type dynamoelectric means operable as a function of the phase relation of the voltage and load current of a synchronous dynamoelectric machine to so control the excitation of the synchronous dynamoelectric machine as to maintain any selected power factor for the synchronous dynamoelectric machine.

The objects hereinbefore stated are merely illustrative of the objects of my invention. Many other objects and advantages of my invention will become more apparent from a study of the following specification and claims, when made in conjunction with the accompanying drawing, in which:

Figure 1 is one diagrammatic showing of my systems of control as applied to a synchronous motor;

Fig. 2 is a diagrammatic showing of a modification of my invention for use with a synchronous generator; and Fig. 3 is a simplified diagrammatic showing of certain features of my invention.

In Fig. 1, M designates a synchronous motor, the excitation of which is to be controlled, disposed to be connected to the alternating current buses 1, 2 and 3 by the electromagnetic line contactor 39. The synchronous motor is provided with two field windings 23 and 33 brought out to four slip rings so that the two windings may be connected in two legs of a balanced Wheatstone bridge shown more clearly in Fig. 3.

A suitable constant voltage exciter Ex provides a selectable fixed excitation to the motor field windings for a selected load. The adjustment of the exciter voltage and field circuit resistance of the fields 23 and 33 may be such as to provide unity power factor or any other power factor value selected for a given load on the motor.

I connect a regulating exciter, or generator R to the junctions 59 and 60, of the Wheatstone bridge. The regulating generator is provided with a series half exciting field 69 and a regulating field 55. The regulating field 55 is energized from the exciter Ex but through a potentiometer resistor 58. One terminal of the regulating field is connected to any selected point on the potentiometer resistor and the other terminal is controlled in its connection to the potentiometer resistor by the rotating element of a dynamoelectric machine S having one winding connected to be responsive to the voltage across the phases of the supply buses and having its other winding connected to the output terminals of current transformers in the load lines of the supply to the synchronous motor. The rotating element of the machine S will thus take a position in space that is a function of the power factor of the synchronous motor. The excitation of regulating field 55 is thus a function of the power factor of the synchronous motor.

For the showing in Fig. 2, the arrangement is such that the regulating exciter is provided with a pattern field 19 energized as a function of the load current of the synchronous machine and the machine S is provided with a reversing controller C to thus make my control system suitable for either a synchronous generator or a synchronous motor.

A better understanding of my invention can probably be had from a study of a typical operation of my system of control for maintaining or controlling the power factor of a synchronous machine. Reference may first be had to Figure 1, wherein my control is shown in conjunction with a synchronous motor. In starting this motor, main circuit breakers (not shown) are closed to energize the buses 1, 2 and 3. Energization of these buses establishing a circuit through conductors 4, 5 and 6 and controller 7 for the constant speed alternating-current motor 8 coupled to drive the exciter Ex and the regulating generator R. The exciter having the self-exciting field 9 and the adjustable rheostat 10 is self excited and comes up to full voltage, so that buses 11 and 12 are energized with direct current voltage of a substantially constant value.

As soon as the exciter and the regulating generator are up to full speed, the synchronous motor may be started. This is accomplished by closing the starting switch 37 whereupon a circuit is established from bus 3 through starting switch 37, actuating coil 38 of the line contactor 39, stop switch 40 to the bus 2. Operation of the motor starting switch closes the contacts 41 which are disposed in parallel relation to the starting switch 37, and the line contactor, therefore, establishes its own holding circuit, and the starting switch 37 may be released. The line contactor also closes the contacts 42, 43, and 44, thereby connecting the armature, or stator winding 45 of the synchronous motor M to the buses 1, 2 and 3. The motor thus starts as an induction motor on the damper winding 46. When the motor is up to full speed, by control forming no part of my invention, the field switch 47, having the contacts 48 and 49, is operated to connect the exciter to the field windings 23 and 33 of the motor. The synchronous motor thus synchronizes and is thus caused to operate at the desired synchronous speed.

The field circuit for the main field windings of the synchronous motor from the exciter may be traced from the positive bus 11 of the exciter Ex, through contacts 49, excitation adjusting rheostat 50, conductor 26, brush 25, slip ring 24, field winding 23, slip ring 22, brush 21, conductor 20, balancing resistor 29, and contacts 48 to the negative bus 12 of the exciter. The other field winding 33 is energized from the positive bus 11 of the exciter by a circuit which may be traced from this bus through contacts 49, field current adjusting rheostat 50, balancing resistor 27, conductor 36, brush 35, slip ring 34, field winding 33, slip ring 32, brush 31, conductor 30, contacts 48 to the negative bus 12 of the exciter. It will be assumed that the synchronous motor field windings 23 and 33 are energized in the direction, or sense, indicated by the full line arrows adjacent these fields.

In the showing in Fig. 1, I schematically show a type of dynamoelectric machine S having a three phase primary or stator winding and a three phase secondary, or rotor winding. The primary windings I connect, as shown, across the three phases of the supply lines to the synchronous motor M. These primary windings are thus energized in phase with the voltage of the supply.

The secondary windings I connect, as shown, to the output terminals of the current transformers 13. The rotor element 14 will thus take a position depending on the power factor of the synchronous motor M.

Mechanically coupled to the rotor element 14 is the arm 52 having the contact element 53 disposed to take any position on potentiometer resistor 58 depending on the power factor of operation of the synchronous motor M.

To energize the regulating field 55 of the regulating generator R, I adjustably connect slide contact 57 to a selected point on the potentiometer resistor 58. If the position of contact 57 is as shown then the regulating field 55 is energized proportional to the resistance on the potentiometer resistor from contact 57 to the position of slide contact 53, the circuit being from contact 57, a portion of resistor 58 to slide contact 53, conductor 54, regulating field 55 and conductor 56 back to adjustable contact 57.

If the operation of the motor is to be at unity power factor at full load and resistor 50 is adjusted for such unity power factor, then the resistor 58 is preferably so adjusted circumferentially of the arm 52 so that contact 53 makes contact at the midpoint of resistor 58, and the adjustable contact 57 is adjusted to be directly opposite contact 53. The regulating generator is then at zero voltage so long as the power factor remains at unity. If the power factor changes for any cause, say, becomes lagging, as from a rise in load, then contact 53 shifts with reference to resistor 58, and thus with reference to the adjusted position of contact 57. The result is that field winding 55 is energized in such a direction to build up the voltage of the regulating generator to boost the excitation of fields 23 and 33 by an amount sufficient to reestablish unity power factor. If the power factor becomes more leading then arm 52 moves in an opposite sense to again establish unity power factor.

My invention is not limited to the maintenance of unity power factor but a synchronous motor may be operated at any selected power factor by merely adjusting contact 57 and suitably adjusting the resistance value of resistor 50.

Further, my invention is not limited to use with a synchronous motor but is equally useful for regulating the output voltage of a synchronous generator. The modification of particular utility for either a motor or a generator I show in Fig. 2.

In the modification shown in Fig. 2, I provide a reversing controller C operated by a controller motor CM for reversing the connection of the output of the current transformers 13 to the rotor element of the "Synchrotie" machines.

If the controller C is moved so that the left-hand segments are in contact with the control fingers, then the function is exactly like the scheme shown in Fig. 1, and thus of special utility for a synchronous motor, whereas if the controller C is moved so that the right-hand segments are in contact with the contact fingers then the connection to the rotor winding of machine S is reversed and the control scheme is of special utility with a synchronous generator.

In the modification shown in Fig. 2, I also provide a pattern field 19 energized from the current transformer 15, through rectifier 16 and adjustable resistor 17.

The regulating generator, when a pattern field is used will not necessarily normally operate at zero voltage but at some selected voltage. The pattern field provides a somewhat more sensitive control, but when used contact 57 may have a different adjustment and resistor 50 may have a different adjustment.

Further, the use of a field as 19 shown in Fig. 2 may and usually is utilized to produce a more leading power factor for the lighter loads on the machine. By suitable adjustment of rheostat 50 and the position of contact 57 a predetermined leading power factor may be selected for the machine. As the machine becomes more loaded the effect of field becomes more pronounced. By suitable choice of the direction of the field produced by winding the power factor may be made progressively less leading as the load increases. The preferred use of field 19 is usually to obtain unity power factor at full load.

While I have shown but two modifications, I do not wish to be limited by the particular circuits shown and described but wish to be limited only by the scope of the claims hereto appended.

I claim as my invention:

1. In a system of control for a synchronous machine, in combination, a synchronous machine having polyphase primary windings and field windings, electric power transmitting leads and means for connecting the power leads to the primary windings, a source of direct current and means for connecting the field windings to the source of direct current, an impedance subjected to a voltage, an alternating-current motor having primary windings connected to the power leads across each of the phases of the synchronous machine and having secondary windings so connected to each phase of the power leads to be responsive to the load current of the synchronous machine whereby the rotor of the alternating current motor will take a position of equilibrium determined by the power factor of the synchronous machine, a movable contact, coupled to the rotor of the alternating-current motor, operable to move to any point on the impedance but preferably so coupled to the rotor of the alternating-current motor that the movable contact holds a position at the mid-point of the impedance when the synchronous machine is operating at the desired power factor, an electric circuit having a control winding for alternating the excitation of the synchronous machine with changes of energization of the control winding, said circuit having one terminal connected to the movable contact and the other terminal selectively connected to any point on the impedance, whereby any shifting of the movable contact changes the energization of the control winding as a function of changes in power factor of said synchronous machine.

2. In a system of control for a synchronous machine, in combination, a synchronous machine having alternating-current windings, power leads, said alternating-current windings being connected to the power leads, field windings for the synchronous machine, said field windings being divided in two substantially equal sections, a balanced Wheatstone bridge circuit, said sections of the field windings being connected, respectively, in two opposite legs of the bridge, two balancing impedances connected, respectively, in the other two opposite legs of the Wheatstone bridge, a source of direct current for exciting the field windings having its leads connected, respectively, to two of the junctions of the bridge, a regulator generator having a self-exciting field, connected to the other two junctions, that is, the balanced junctions of the bridge, and a second field for the regulator generator energized as a function of the power factor of the synchronous machine, whereby the excitation of the field windings of the synchronous machine is controlled as a function of the power factor of the synchronous machine.

3. In a system of control for synchronous machines, in combination, a synchronous machine having alternating-current windings, power leads, and alternating-current windings being connected to the power leads, field windings for the synchronous machine, said field windings being divided in two substantially equal sections, a balanced Wheatstone bridge circuit, sections of the said field windings being connected, respectively, in two opposite legs of the bridge, two balancing impedances connected, respectively, in the other two opposite legs of the Wheatstone bridge, a source of direct current for exciting the field windings having its leads connected, respectively, to two of the junctions of the bridge, a regulator generator having a self-exciting field, connected to the other two junctions, that is, the balanced junctions of the bridge, a second field winding for the regulator generator, a potentiometer resistor connected across the source of direct current, an electromagnetic device having a stationary element and a movable element, said electromagnetic device having two energizing windings one being connected across the power leads and the other being connected to be responsive to the current in the power leads whereby the movable element of said electromagnetic device takes a position relative to the stationary element that is a function of the power factor of the synchronous machine, said second field winding of the regulator generator having its terminals connected, respectively, to any selected point in the potentiometer resistor and the movable element of said electromagnetic device.

4. In a scheme for exciting the field windings of a synchronous machine having its field windings divided in two sections, a balanced Wheatstone bridge including one section of said field windings in each of two opposite legs of said bridge and two balancing resistors, one connected in one of the remaining legs of the bridge and the other connected to the opposite and last remaining leg of the Wheatstone bridge, a source of direct-current energy connected to two of the junctions of the bridge to excite the field windings, a control exciter connected to the remaining two junctions of the bridge, and means for energizing the control exciter as a function of the power factor of the synchronous machine, said control exciter being so connected to the junctions of the Wheatstone bridge with reference to the connection of the source of direct-current energy to the other junctions of the Wheatstone bridge that the control exciter maintains a selected power factor for the synchronous machine.

5. In a scheme for exciting the field windings of a synchronous machine having its field windings divided in two sections, a balanced Wheatstone bridge including one section of said field windings in each of two opposite legs of said bridge and two balancing resistors, one connected in one of the remaining legs of the bridge and the other connected to the opposite and last remaining legs of the Wheatstone bridge, a source of direct-current energy connected to two of the junctions of the bridge to excite the field windings, a control exciter connected to the remaining two junctions of the bridge, said control exciter having a self-exciting field winding to give the control exciter a given electrical characteristic, and a second field winding for the control exciter, said second field winding being excited as a function of the power factor of the synchronous machine.

6. In a scheme for exciting the field windings of a synchronous machine having its field windings divided in two sections, a balanced Wheatstone bridge including one section of said field windings in each of two opposite legs of said bridge and two balancing resistors, one connected in one of the remaining legs of the bridge and the other connected to the opposite and last remaining leg of the Wheatstone bridge, a source of direct-current energy connected to two of the junctions of the bridge to excite the field windings, a control exciter connected to the remaining two junctions of the bridge, said control exciter having a self-exciting field winding to give the control exciter a given electrical characteristic, a second field winding for the control exciter, said second field winding being excited as a function of the power factor of the synchronous machine, and a third field winding for the synchronous machine energized in direct proportion to the load current of the synchronous machine said second and third field windings being so wound and connected with reference to each other that the power factor becomes increasingly more leading as the load on the machine decreases from a given load to no load.

7. In a system of control for a synchronous motor, in combination, a synchronous motor having a primary, or armature, winding, and a secondary, or field, winding, a source of alternating current connected through a plurality of power leads to the armature winding, a source of direct current having two terminals, said synchronous motor field winding being connected to the source of direct current, a potentiometer resistor connected to said terminals, an alternating-current induction motor generally of the wound rotor type having one of its windings connected across the power leads to be responsive to the voltage across the power leads and having its other winding connected to be responsive to the current in the power leads, whereby the rotor of the induction motor takes a position with reference to its stator indicative of the power factor of the synchronous motor, a regulating generator interconnected with the synchronous motor field windings and the terminals of the source of direct current to control the excitation of the synchronous motor, a control field winding for the regulating generator, a contact connected to the rotor of the induction motor and operable to move over the entire length of the potentiometer resistor, said control field winding of the regulating generator having one of its terminals connected to the contact operated by the rotor of the induction motor and having its other terminal connected to any selected point on the potentiometer resistor, whereby the control field in the event of any change of power factor is energized to alter the field excitation of the synchronous motor to reestablish the power factor selected by the connection of the control field terminal to the potentiometer resistor.

8. In a control for a three-phase synchronous machine, in combination, a synchronous machine having three power leads and having a field winding, three current transformers one interconnected with each of the three power leads, a wound rotor induction motor having one of its windings connected across the power leads and the other of its windings connected across the terminals of the current transformer, means responsive to a reversal of the current in the power leads, as will occur when the synchronous machine changes from motor operation to generator operation, for reversing the connection of the transformer terminals to the winding of the induction motor, whereby the rotor of the induction motor will take a position with reference to a single given point on the stator indicative of the power factor of the machine and will not rotate through 180 electrical degrees when the operation of the machine changes from motor operation to generator operation, and means responsive to the position of the rotor of the induction motor with reference to said single point on the stator for controlling the excitation of the synchronous machine.

9. In a control for a three-phase synchronous machine, in combination, a synchronous machine having three power leads and having a field winding, three current transformers one interconnected with each of the three power leads, a wound rotor induction motor having one of its windings connected across the power leads and the other of its windings connected across the terminals of the current transformer, means responsive to a reversal of the current in the power leads, as will occur when the synchronous machine changes from motor operation to generator operation, for reversing the connection of the transformer terminals to the winding of the induction motor, whereby the rotor of the induction motor will take a position with reference to a single given point on the stator indicative of the power factor of the machine and will not rotate through 180 electrical degrees when the operation of the machine changes from motor operation to generator operation, means responsive to the position of the rotor of the induction motor with reference to said single point on the stator for controlling the excitation of the synchronous machine and means responsive to the load current of the synchronous machine for altering the controlling effect on the excitation of the field winding of the synchronous machine as a function of the change in load current.

GURNEY L. GODWIN.

REFERENCES CITED

The following references are of record in the file of this patent:

UNITED STATES PATENTS

| Number | Name | Date |
|---|---|---|
| 816,442 | Emmet | Mar. 27, 1906 |
| 1,001,711 | Tirrill | Aug. 29, 1911 |
| 762,744 | McKay | June 14, 1904 |
| 2,367,930 | Crary | Jan. 23, 1945 |

FOREIGN PATENTS

| Number | Country | Date |
|---|---|---|
| 576,334 | Germany | May 10, 1933 |
| 594,015 | France | June 8, 1925 |